Sept. 10, 1957 R. L. HALVORSON 2,806,083

TELEPHONE HANDSET TERMINATING AND AMPLIFIER CIRCUIT

Filed Dec. 30, 1953

WITNESSES
Edwin C. Bassler
Leon M. Garman

INVENTOR
Robert L. Halvorson
BY
F. E. Browder
ATTORNEY

United States Patent Office 2,806,083

Patented Sept. 10, 1957

2,806,083

TELEPHONE HANDSET TERMINATING AND AMPLIFIER CIRCUIT

Robert L. Halvorson, Baltimore, Md., assignor to Westinghouse Electric Corporation, East Pittsburgh, Pa., a corporation of Pennsylvania Application December 30, 1953, Serial No. 401,235

10 Claims. (Cl. 179—1)

Figure 1:
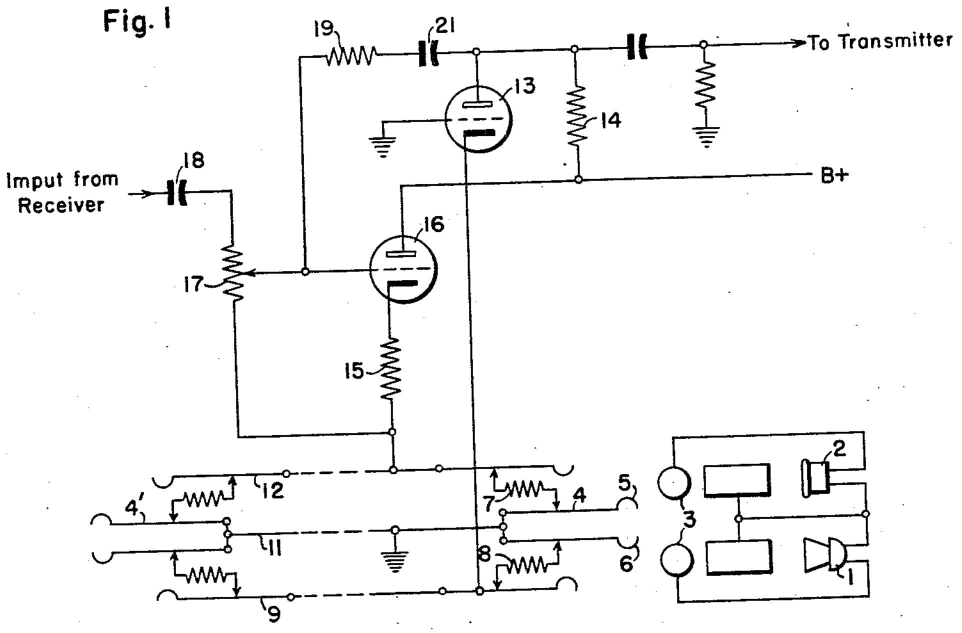

My invention relates to telephone systems and in particular relates to a circuit for connecting a plurality of telephone handsets through electron tubes to a channel of an electric communication system. I herein illustrate its principles as applied to a microwave point-to-point radio communication system.

Communication systems which comprise a plurality of widely separated stations, such as pumping stations along a natural gas line or substations of an electrical power system, are being extensively installed in which the transmission agencies are beams of radio waves a few centimeters long which are transmitted between relay towers miles apart across country. The frequency of such waves is so high that a relatively narrow channel may be modulated to carry well over thirty separate signals simultaneously, so that not only voice communication but code signals continuously reporting such things as machine operation, switching equipment positions, and meter readings may be transmitted from substations to a supervisory center tens or hundreds of miles away. It is, however, naturally desirable that separate stations be provided with telephone handsets by which voice communications may be maintained when desired, and it frequently is desired that each station have a number of different handsets, located sometimes hundreds of feet apart, from any one of which the conversation may be carried on, or which may be used as a local station intercommunication system.

My invention comprises circuit connections by which one or more telephone handsets are arranged to supply modulation to the transmitter of the output beam at a station of a communication system such as has just been described as well as to give local station intercommunication service. My circuit is, however, usable for modulation in telephone circuits generally, regardless of whether radio waves are, or are not, the transmission agency.

Since many of the handsets above mentioned are largely for emergency use or likely to be used rather infrequently, it is highly desirable that their circuits be as simple and inexpensive as possible. Relatively low cost is one of the features of my arrangement.

One object of my invention is accordingly to provide a new and improved circuit enabling telephone handsets to cooperate with communication channels.

Another object is to interconnect a source of modulated current to control a communication channel while at the same time enabling it to operate one or more local sound reproducing devices located ahead of that channel.

Another object is to interconnect a plurality of microphone and receiver units with each other into a local intercommunication system and to modulate a communication channel extending to distant points.

Another object is to provide a circuit capable of matching the relatively high impedance of an electronic signal receiver output with a much lower impedance network comprising one or more telephone handsets or other acoustic devices; and of maintaining such matching regardless of the number of these devices which are, at any one time, switched into circuit.

Still another object is to provide a network capable of interconnecting one or more microphone-and-receiver telephone units to furnish modulation currents to a radio transmitter while at the same time providing telephone intercommunication between points in the network itself.

Yet another object is to provide a circuit which is simple and inexpensive for achieving the foregoing objects.

Figure 2:
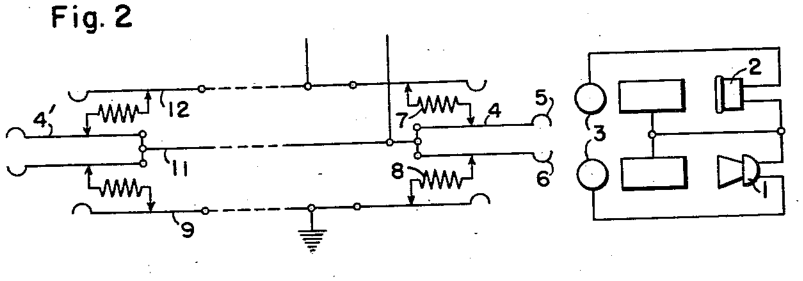

Other objects of my invention will become apparent upon reading the following description taken in connection with the drawings in which:

Figure 1 is a schematic diagram of a portion of a local or station circuit embodying the principles of my invention; and Fig. 2 is an alternative form which the lower portion of the Fig. 1 circuit may take.

Referring in detail to Fig. 1, the microphone 1 and earphone 2 of a telephone handset at one of the stations on a communication system, which may be of the microwave radio type, are connected to a double plug 3 adapted to engage in conventional fashion a double jack 4 having two sets of spring contacts 5, 6 which are bridged by resistors 7, 8 when the plugs 3 are not in the jacks. Any desired number of other handsets and jacks, such as 4' may be located at other points about the station interconnected by a ground bus 11, which is connected to one contact of each member of the double jack. The bus 9 is connected to the cathode of a grounded-grid amplifier 13 on the central communication panel for the station. The anode of amplifier 13 is connected through a load resistor 14 to the positive pole of a direct current source B+ having its negative pole grounded, and through a conventional capacitor-resistor coupling to the modulation circuit for the transmitting generator of the station.

The bus 12 which is connected to the earphone contact on each jack is connected through a cathode resistor 15 to the cathode of a triode 16 having its anode connected to the positive pole B+. The bus 12 is also connected through a potentiometer 17 and a blocking capacitor 18 to the output of the station receiver. The potentiometer tap is connected to the control electrode of amplifier 16 and also through a feedback channel embodying a resistor 19 and capacitor 21 to the anode of amplifier 13. The amplifiers 13 and 16 may conveniently comprise the halves of a double triode.

Each station on the communication system comprises such a circuit as is shown in Fig. 1 and has its own receiver and transmitter. The modulating circuit on which the output of amplifier 13 is impressed may also be controlled by a number of code signals or other modulating signals segregated as subcarrier channels in accordance with known practice in the communication art.

As long as any handset 3 is not plugged into its jack 4, its place is taken by resistors 7 and 8 which have substantially the impedances respectively of earphone 2 and microphone 1 so that the balance and match of the network comprising buses 9, 11, 12 remains undisturbed regardless of the number of handsets 3 which are plugged into the network. When a handset 3 is plugged into a jack, such as 4, the plate current of amplifier 13 flows through microphone 1 (in multiple with its equivalent impedances 8 at jack 4', etc.) and furnishes an operating current for the microphone. Speech into the microphone 1 varies the cathode-to-grid potential of amplifier 13 and its output current modulates the station transmitter.

Signals coming into the station receiver are impressed on the grid of amplifier 16 and modulate its plate current which passes through cathode resistor 15 to bus 12 and so through the earphone 2 (in multiple with its equivalent impedances 7 at jack 4', etc.). If plugs are in the jacks 4', etc., as well as jack 4, the receiver signals will be heard in them, and anyone speaking into their microphones can modulate the station transmitter just as can the person at jack 4.

The feedback channel through capacitor 21 causes the output of amplifier 13 to be impressed on amplifier 16 and so speech into any microphone 1 is amplified and heard in the earphones, both of any other handsets which may be plugged in, and of that handset itself. As a result of this, the buses 9, 11 and 12 constitute a station intercommunication telephone system between any local handsets, whether the transmitter to the other stations of the system is operating or not. Moreover, the ability of the speaker to hear his voice in his own earphone enables him to tell whether the sysem is in working order. For example, failure of the B+ voltage or of amplifier 13 would result in the speaker hearing no sound in his own earphone.

The Fig. 2 modification of the circuit differs from that just described for Fig. 1 only in that the cathode of amplifier 13 is connected to the middle bus 11 and the bus 9 is grounded instead of bus 11. This modification has an advantage over the Fig. 1 circuit for simple private-line (two terminal) communication systems in that the cathode current of both amplifiers 13 and 16 traverses the microphone 1 (in multiple with its equivalent impedances 8 at jack 4', etc.) resulting in a more desirable value of microphone current; but has the disadvantage on more complex station-networks that feedback may go into self-oscillation and cause "howling."

While I have illustrated the broad principles of my invention by describing a specific telephone circuit, those principles may be applied in other arrangements which will be evident to those skilled in the art, and I therefore intend that the terms of the following claims shall be given their broadest reasonable interpretation.

I claim as my invention:

1. In combination with a communication system interconnecting a plurality of separate stations, a local telephone network at at least one said station comprising three bus conductors, a first telephone jack having its contacts connected between one of said bus conductors and the second thereof, a second telephone jack having its contacts connected between said one bus conductor and the third of said bus conductors, a sound reproducer and a microphone, means for plugging said sound reproducer into said first jack and for plugging said microphone into said second jack, a first device having an anode, cathode and control electrode, connected from said cathode through a cathode resistor to said second bus conductor, a receiver energized by signals coming in over said system, connections from said control electrode to one side of the output of said receiver, said second device having an anode, cathode and control electrode, connections from the last said cathode to said one bus conductor connections from the last said control electrode to said third bus conductor, a load resistor, a direct current source having its negative pole connected to said third bus conductor and its positive pole connected to the anode of asid first device and through said load resistor to the anode of said second device, a modulation channel for a signal transmitter connected between said third bus conductor and the anode of said second device, and a connection from said third bus conductor to the other side of the output of said receiver.

2. In combination with a communication system interconnecting a plurality of separate stations, a local telephone network at at least one said station comprising three bus conductors, a first telephone jack having its contacts connected between one of said bus conductors and the second thereof, a second telephone jack having its contacts connected between said one bus conductor and the third of said bus conductors, a sound reproducer and a microphone, means for plugging said sound reproducer into said first jack and for plugging said microphone into said second jack, a first device having an anode, cathode and control electrode, connections from said cathode through a cathode resistor to said second bus conductor, a receiver energized by signals coming in over said system, connections from said control electrode to one side of the output of said receiver, said second device having an anode, cathode and control electrode, connections from the last said cathode to said third bus conductor, connections from the last said control electrode to said one bus conductor, a load resistor, a direct current source having its negative pole connected to said one bus conductor and its positive pole connected to the anode of said first device and through said load resistor to the anode of said second device, a modulation channel for a signal transmitter connected between said one bus conductor and the anode of said second device, a connection from said one bus conductor to the other side of the output of said receiver, and a resistor connected between said one side of said receiver and said second bus conductor.

3. In combination with a communication system interconnecting a plurality of separate stations, a local telephone network at at least one said station comprising three bus conductors, a first telephone jack having its contacts connected between one of said bus conductors and the second thereof, a second telephone jack having its contacts connected between said one bus conductor and the third of said bus conductors, a sound reproducer and a microphone, means for plugging said sound reproducer into said first jack and for plugging said microphone into said second jack, a first device having an anode, cathode and control electrode, connections from said cathode through a cathode resistor to said second bus conductor, a receiver energized by signals coming in over said system, connections from said control electrode to one side of the output of said receiver, said second device having an anode, cathode and control electrode, connections from the last said cathode to said one bus conductor, connections from the last said control electrode to said third bus conductor, a load resistor, a direct current source having its negative pole connected to said third bus conductor and its positive pole connected to the anode of said first device and through said load resistor to the anode of said second device, a modulation channel for a signal transmitter connected between said third bus conductor and the anode of said second device, a connection from said third bus conductor to the other side of the output of said receiver, and a connecting channel from the anode of said second device to the control electrode of said first device.

4. In combination with a communication system interconnecting a plurality of separate stations, a local telephone network at at least one said station comprising three bus conductors, a first telephone jack having its contacts connected between one of said bus conductors and the second thereof, a second telephone jack having its contacts connected between said one bus conductor and the third of said bus conductors, a sound reproducer and a microphone, means for plugging said sound reproducer into said first jack and for plugging said microphone into said second jack, a first device having an anode, cathode and control electrode, connection from said cathode through a cathode resistor to said second bus conductor, a receiver energized by signals coming in over said system, connections from said control electrode to one side of the output of said receiver, said second device having an anode, cathode and control electrode, connections from the last said cathode to said third bus conductor, connections from the last said control electrode to said one bus conductor, a load resistor, a direct current source having its negative pole connected to said one bus conductor and its positive pole connected to the anode of said first device and through said load resistor to the anode of said second device, a modulation channel for a signal transmitter connected between said one bus conductor and the anode of said second device, a connection from said one bus conductor to the other side of the output of said receiver, a resistor connected between said one side of said receiver and said second bus conductor, and a connecting channel from the anode of said second device to the control electrode of said first device.

5. A telephone network comprising three bus conductors, a first telephone jack having its contacts connected between one of said bus conductors and the second thereof, a second telephone jack having its contacts connected between said one bus conductor and the third of said bus conductors, a sound reproducer and a microphone, means for plugging said sound reproducer into said first jack and for plugging said microphone into said second jack, a first device having an anode, cathode and control electrode, connections from said cathode through a cathode resistor to said second bus conductor, a second device having an anode, cathode and control electrode, connections from the last said cathode to said one bus conductor and from the last said control electrode to said third bus conductor, and means for connecting the anode of said first device through a load resistor to the anode of said second device.

6. A telephone network comprising three bus conductors, a first telephone jack having its contacts connected between one of said bus conductors and the second thereof, a second telephone jack having its contacts connected between said one bus conductor and the third of said bus conductors, a sound reproducer and a microphone, means for plugging said sound reproducer into said first jack and for plugging said microphone into said second jack, a first device having an anode, cathode and control electrode, connections from said cathode through a cathode resistor to said second bus conductor, a second device having an anode, cathode and control electrode, connections from the last said cathode to said third bus conductor, a receiver energized by signals coming in over said system, connections from said control electrode connected to said one bus conductor, and means for connecting the anode of said first device through a load resistor to the anode of said second device.

7. A telephone network comprising three bus conductors, a first telephone jack having its contacts connected between one of said bus conductors and the second thereof, a second telephone jack having its contacts connected between said one bus conductor and the third of said bus conductors, a sound reproducer and a microphone, means for plugging said sound reproducer into said first jack and for plugging said microphone into said second jack, a first device having an anode, cathode and control electrode, connections from said cathode through a cathode resistor to said second bus conductor, a second device having an anode, a cathode and control electrode, connections from the last said cathode to said one bus conductor and from the last said control electrode to said third bus conductor, means for connecting the anode of said first device through a load resistor to the anode of said second device, and a connecting channel from the anode of said second device to the control electrode of said first device.

8. In combination with a communication system interconnecting a plurality of separate stations, a local telephone network at at least one said station comprising three bus conductors, a first telephone jack having its contacts connected between one of said bus conductors and the second thereof, a second telephone jack having its contacts connected between said one bus conductor and the third of said bus conductors, a sound reproducer and a microphone, means for plugging said sound reproducer into said first jack and for plugging said microphone into said second jack, a first device having an anode, cathode and control electrode, connections from said cathode through a cathode resistor to said second bus conductor, a receiver energized by signals coming in over said system, connections from said control electrode to one side of the output of said receiver, said second device having an anode, cathode and control electrode, connections from the last said cathode to said third bus conductor, connections from the last said control electrode to said one bus conductor, a load resistor connecting said anodes a direct current source having its negative pole connected to said one bus conductor and its positive pole connected to the anode of said first device and through said load resistor to the anode of said second device, a modulation channel for a signal transmitter connected between said one bus conductor and the anode of said second device, and a connection from said one bus conductor to the other side of the output of said receiver.

9. In combination with a communication system interconnecting a plurality of separate stations, a local telephone network at at least one said station comprising three bus conductors, a first telephone jack having its contacts connected between one of said bus conductors and the second thereof, a second telephone jack having its contacts connected between said one bus conductor and the third of said bus conductors, a sound reproducer and a microphone, means for plugging said sound reproducer into said first jack and for plugging said microphone into said second jack, a first device having an anode, cathode and control electrode, connections from said cathode through a cathode resistor to said second bus conductor, a receiver energized by signals coming in over said system, connections from said control electrode to one side of the output of said receiver, a second device having an anode, cathode and control electrode, connections from the last said cathode to said third bus conductor, connections from the last said control electrode to said one bus conductor, a load resistor connecting said anodes a direct current source having its negative pole connected to said one bus conductor and its positive pole connected to the anode of said first device and through said load resistor to the anode of said second device, a modulation channel for a signal transmitter connected between said one bus conductor and the anode of said second device, a connection from said one bus conductor to the other side of the output of said receiver, and a connecting channel from the anode of said second device to the control electrode of said first device.

10. A telephone network comprising three bus conductors, a first telephone jack having its contacts connected between one of said bus conductors and the second thereof, a second telephone jack having its contacts connected between said one bus conductor and the third of said bus conductors, a sound reproducer and a microphone, means for plugging said sound reproducer into said first jack and for plugging said microphone into said second jack, a first device having an anode, cathode and control electrode, connections from said cathode through a cathode resistor to said second bus conductor, a second device having an anode, cathode and control electrode, connections from the last said cathode to said third bus conductor, connections from the last said control electrode to said one bus conductor, means for connecting the anode of said first device through a load resistor to the anode of said second device, and a connecting channel from the anode of said second device to the control electrode of said first device.

No references cited.